Figure 1:
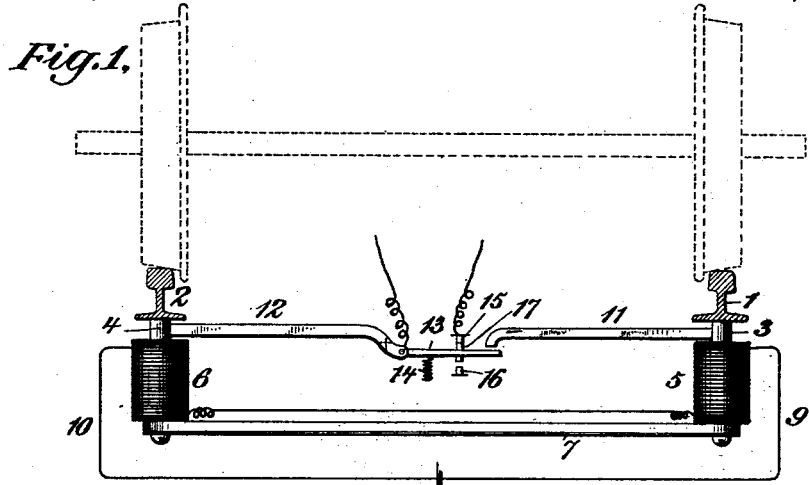

(No Model.)

T. B. DIXON.
TRACK INSTRUMENT.

No. 570,700. Patented Nov. 3, 1896.

Witnesses:—

Inventor:—
Thomas B. Dixon
by E. M. Marble & Sons
His Attorneys.

UNITED STATES PATENT OFFICE.

THOMAS BULLITT DIXON, OF HENDERSON, KENTUCKY.

TRACK INSTRUMENT.

SPECIFICATION forming part of Letters Patent No. 570,700, dated November 3, 1896.

Application filed September 12, 1895. Serial No. 562,263. (No model.)

*To all whom it may concern:*

Be it known that I, THOMAS BULLITT DIXON, a citizen of the United States, residing at Henderson, in the county of Henderson and State of Kentucky, have invented certain new and useful Improvements in Track Instruments; and I do hereby declare the following to be a full, clear, and exact description of the invention, such as will enable others skilled in the art to which it appertains to make and use the same.

My invention relates generally to track instruments for operating signals or other apparatus designed to be operated by and in accordance with the movements of trains upon a railway-track, and particularly to a track instrument designed for operating the circuits of electrical railway signaling systems.

The circuits of railway signaling systems are usually operated either by track-circuits formed by dividing the track into electrically-insulated sections, through the rails of which electric currents may be passed in such a manner that the wheels of a train on one of said sections will either short-circuit or complete the circuit through the rails of said section, or else the circuits are operated by circuit breakers or closers, termed "track" instruments, which usually are operated by track-levers or similar devices arranged to be depressed by the wheels of the train passing over the track or by electric currents passing through short insulated sections of track and arranged to be completed or short-circuited by trains passing over said sections. The use of insulated sections of track has been attended with many disadvantages because of the difficulty in securing proper insulation between the lines of the rails, which necessitates unusually expensive construction of the railway-bed and unusual care in the maintenance thereof, because expensive bonding of the rails has been required in order to insure the electrical continuity of the rails, and because of the difficulty of insulating one section of track electrically from another section, the rail-joint at the point where the insulating material is placed being, as a rule, undesirably weak. The use of track instruments has been objectionable because of the difficulty of so constructing a track instrument that it shall not be liable to breakage or to derangement under the influence of the shock or jar of passing trains, which shall not be liable to excessive wear, requiring continual replacement, and which shall not be affected by snow, ice, water, or dust.

By my invention I provide a track instrument which does not require to be operated by electrically-insulated track-sections or by track-levers or other similar devices operated by wheels of the train passing over the track, which is not subject to injury or derangement from shock or jar, which is not affected by snow, ice, water, or dust, and which may be located at a point distant from the railway-track, if so desired, so as to protect it from injury and interference. The essential difference between my track instrument and former track instruments lies in the substitution for an electric circuit arranged to be completed or short-circuited by wheels passing over the track for operating the track instrument of a magnetic circuit produced by a magnet having poles so arranged that a portion of the magnetic circuit is shunted or diverted from its normal field when a train passes over the track, and is caused to pass through portions of the train, such as the car wheels and axles, which conduct magnetism. The shunting of a portion of the magnetic circuit away from this field weakens the field and causes the operation of a signal-controlling device so constructed and arranged as to be operated by variations in strength of the magnetic field. The portions of a train through which the magnetic circuit is passed, such as the car wheels and axles, which are always composed of iron or steel, materials which conduct magnetism, may for the purpose of this application be said to be composed of magnetic materials, and may be termed "magnetic" portions of the train.

The use of the magnetic field or circuit instead of the electric circuit has the advantage that there is no leakage due to moisture or to imperfect insulation of the rails, the only magnetic insulation required being afforded by the ordinary wooden ties by which the rails are supported; that the required variation of the magnetic field is not dependent upon the making of a perfect contact between the wheels and the rails, but may be effected even though the wheels do not actually make contact with the rails, as where the rails are covered by sleet or by dust and sand; that the moving parts of the track instrument may be located at a distance from the track and may be protected against the transmission to them of shock or jar, and that where it is necessary to place the track instrument in a magnetically-insulated track-section, as where two track instruments must be placed in close proximity to each other, the insulating material may be some strong non-magnetic metal, such as brass, so that the rail-joint at the point of insulation is not weakened.

My invention consists in the novel means employed for causing the operation of a magnetically-operated signal-controlling device by trains passing over the track; in the novel magnetically-operated signal-controlling device employed; in the connection of the cores of the magnet to the track-rails, thereby constituting the track-rails poles of the magnet and causing the magnetic circuit of the magnet to pass through the wheels and axles of trains passing over the track, and in the novel combination, construction, and arrangement of the parts of the track instrument.

The objects of my invention are, first, to provide a track instrument which shall not require to be operated by electrical track-circuits or by rail-levers or similar devices; second, to provide a track instrument which shall not be affected by water, snow, ice, or dust, and which may be so constructed that it shall not be affected by shock or jar due to passing trains, and, third, to make the track instrument simple in construction, as inexpensive as possible, durable, not liable to derangement, and easy of installation. These objects are attained in the track instrument herein described and illustrated in the drawings which accompany and form a part of this application, in which the same reference-numerals indicate the same or corresponding parts, and in which—

Figure 2:
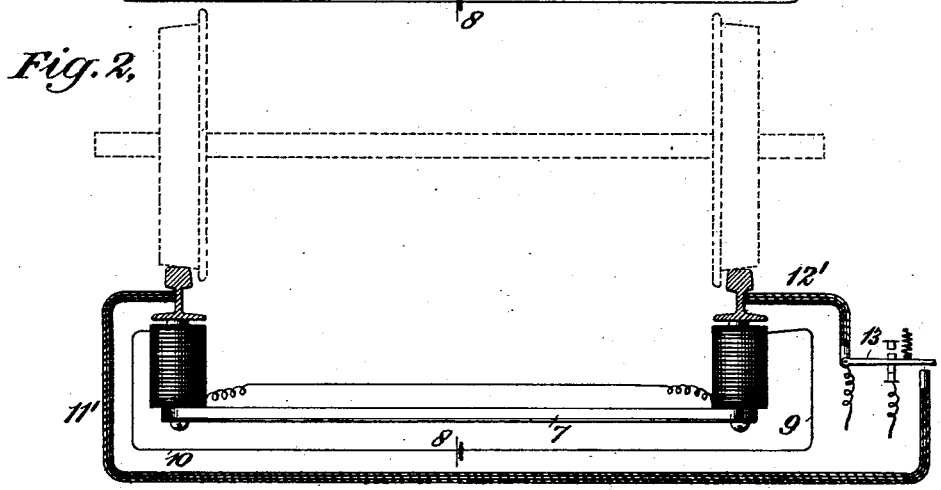
Figure 3:
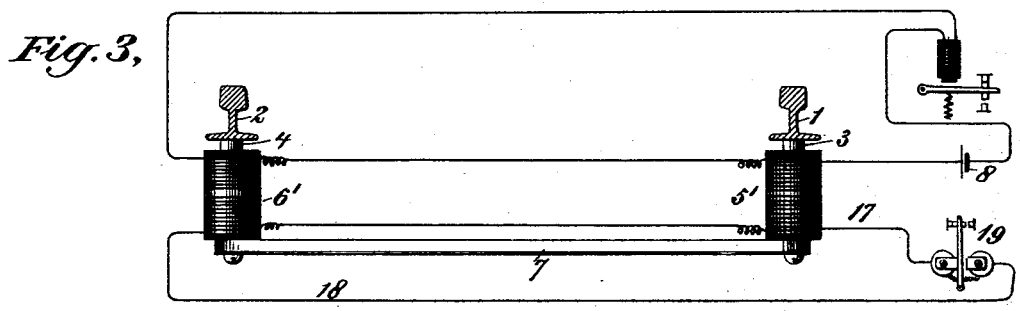

Figure 1 shows one form of my track instrument in place upon a track, the rails being sectioned transversely. Fig. 2 is a similar view showing another form of my track instrument in which the contact-lever is placed to one side of and at some distance from the rails, being connected therewith by flexible magnetic conductors, so that the transmission of vibration from the rails to the contact-lever may be reduced to a minimum; and Fig. 3 is a similar view illustrating another form of magnetic track instrument operating upon a somewhat different principle from the track instruments shown in Figs. 1 and 2, but the magnet of which is likewise connected to the rails, this arrangement of the magnet being, as already stated, one feature of my invention.

In the drawings, 1 and 2 are the track-rails, which may be supported upon ties of wood or other non-magnetic material in the ordinary and common way. Beneath the rails are electromagnets having cores 3 and 4 connected to the rails and helices 5 and 6 surrounding the cores. A bar 7 of magnetic material connects the two cores 3 and 4, thus forming substantially an ordinary horseshoe electromagnet. A battery 8 is connected by conductors 9 and 10 with the helices of the magnets and serves to energize the same.

Leading from the rails, or from the cores 3 and 4 in close proximity to the rails, are magnetic conductors 11 and 12 in Fig. 1 and 11' and 12' in Fig. 2, which in the track instrument shown in Fig. 2 may be iron bars and in the track instrument shown in Fig. 2 are flexible magnetic conductors, which may be composed of a number of strands of soft-iron wire formed into a cable. These conductors extend toward each other, but do not quite meet, the gap between their poles being bridged by a pivoted lever 13, of magnetic material, connected to one conductor and arranged to swing in close proximity to the pole of the other conductor. A retractile device, as a spring, tends to draw the lever away from the pole of this conductor. The lever may operate by its movement a signal-controlling device, as contact-points of an electric circuit, such as 15 and 16, and has suitable stops which, as in electrical relays, may be contact-points as well.

When the cores 3 and 4 of the magnets are energized by passing current through their helices, they energize rails 1 and 2 and the conductors 11 and 12. As the helices 5 and 6 are wound to energize their cores oppositely, rails 1 and 2 are of opposite polarity, as are conductors 11 and 12. Therefore contact-lever 13, which is attached to and therefore magnetized by, one of the conductors 12 or 12', is attracted strongly toward the pole of the other conductor 11 or 11'. When, however, car-wheels are on the rails 1 and 2, as indicated in dotted lines, magnetic circuit is diverted or shunted to a great extent at least from the magnetic field between the conductors 11 and 12 or 11' and 12', and is caused to pass through the rails and car wheels and axles, thus greatly reducing the strength of the field of these conductors, so that the retractile spring 14 may draw the contact-lever 13 away from the pole of conductor 11, causing it to break contact with front stop 15 and to make contact with back stop 16. The lever 13 may be connected with one terminal of an electric circuit controlling a signal or other device which it is desired to have operated by the track instrument, and either stop 15 or 16, or both, may be contact-points, terminals of electric circuits, so that the track instrument is adapted for operating both normally open circuits and normally-closed circuits. It may also be used to operate the controlling-valve of a pneumatic or hydraulic signal system or other signal-controlling device.

As soon as the wheels have passed over the rails 1 and 2 the magnetic circuit is restored in full strength to the field between conductors 11 and 12 and the lever 13 is reattracted. As the car-wheels commonly used are frequently made of hard iron and are of small magnetic permeability, and as it is important, in order to insure prompt movement of the lever 13, that the variations in the strength of the field of magnetic conductors 11 and 12, caused by wheels passing over the track, shall be very considerable, it may be necessary to use conductors 11 and 12 of considerable magnetic resistance. This may be accomplished by making the conductors of small size, or, if that be not desirable or sufficient, by breaking their continuity at one or more points by interposing sections of non-magnetic material. It is not necessary, however, that the magnetic resistance of conductors 11 and 12 shall actually be greater than that of the car wheels and axles, what is necessary being simply such a relation between the magnetic resistance of conductors 11 and 12 and of the car wheels and axles that the presence of car-wheels on the rails shall cause the shunting of enough of the magnetic field through the wheels and away from conductors 11 and 12 to perceptibly weaken their magnetic strength and to permit the spring 14 to draw the lever 13 away from the pole of conductor 11.

In the track instrument shown in Fig. 1 the lever 13 and the conductors 11 and 12 are placed between the rails. In order to reduce danger of false operation of the lever 13, due to the shock or jar of passing trains, the lever 13 may be arranged to swing in a horizontal plane instead of in a vertical plane, there being less vibration in a horizontal plane than in a vertical plane. Conductors 11 and 12 may, however, be led off to one side of the track, as are the conductors 11' and 12' shown in Fig. 2. To further reduce the danger of false operation of lever 13, owing to shock or jar, the poles of conductors 11' and 12' and the lever 13 may be supported upon some solid support, as a pile driven deep into the earth, and flexible magnetic conductors 11' and 12', composed, as above stated, of a number of small soft-iron wires, may be used, which, because of their flexibility, will not transmit vibration to the lever 13 to any appreciable extent.

The track instrument shown in Fig. 3 operates upon a somewhat different principle from the track instruments shown in Figs. 1 and 2. Its helices 5' and 6' are double, there being provided, besides the energizing-coils connected with the battery 8, secondary coils connected by conductors 17 and 18 with the polar relay 19. The lines of force of the magnetic field normally pass from one rail to the other through the air. When wheels are upon the rails, however, a path of less resistance than the air is provided, thus causing a very considerable variation in the strength of the magnetic field, which induces a current in the secondary coils of the helices 5' and 6', thus deflecting the armature of relay 19. When the wheels leave rails 1 and 2, there is a corresponding variation in the strength of the magnetic field, which induces a second current in the helices 5' and 6' of opposite direction to the current first induced, which deflects the armature of relay 19 back to its normal position.

Relay 19, together with conductors 17 and 18 and the secondary coils of helices 5' and 6', may be considered a magnetically-operated signal-controlling device, since it is operated by the currents induced in these helices and conductors by variation in the field of the magnet.

A safety-relay 20 may be placed in the circuit of battery 8, as shown in Fig. 3, which, in case of variation of the magnetic field of magnets 5' and 6', due to the failure of battery 8 or to breakage of its circuit, will break a signal-circuit or otherwise operate a signal, indicating that the track instrument is out of order, and will prevent the signals of the block from going to "safety."

In all of the forms of track instrument herein described, whether the lever 13 operates every time a pair of wheels passes over the track instrument or whether the lever operates only once while the whole train is passing depends upon the strength of the magnets used and upon the length of the magnetically continuous rail-sections used. If the rails be magnetically continuous for a distance considerably greater than the distance between two adjacent pairs of wheels of a car, and if the magnets be sufficiently powerful to energize the whole length of the rail-section, then lever 13 will operate once only while the train is passing; but if the rail-section to which the magnets 5 and 6 are connected be magnetically continuous for a distance shorter than the distance between two adjacent pairs of wheels of a car, then the lever 13 will be operated each time a pair of wheels passes over the track instrument.

The connection of the cores of the magnet with the track-rails so as to constitute the rail-poles of the magnet is an important feature of my invention, for not only is it possible by varying the length of the rail-sections to which the magnets are connected to cause the track instrument to operate each time a pair of wheels pass over the track instrument, or once only during the passage of a train, at will, but the track-rails form very efficient poles for causing the magnetic circuit to pass through the car wheels and axles. The passing of the magnetic circuit through the car wheels and axles, rather than through special armatures carried upon the train, is important, since it avoids the necessity of specially equipping cars with special armatures for operating the track instrument.

Permanent magnets may be used instead of electromagnets, and I do not limit myself to the use of electromagnets.

Having thus completely described my invention, what I claim, and desire to secure by Letters Patent, is—

1. In a track instrument, the combination, with a magnet producing a magnetic field adapted to influence a magnetically-operated signal-controlling device, said magnet having pole-pieces so arranged that when a train passes over the track a portion of the magnetic circuit is diverted from said field by being shunted through magnetic portions of the train, and the magnetic field is thereby weakened, of an armature movably mounted in said magnetic field and arranged to be influenced thereby, a retractile device opposing the action of said magnetic field on said armature, whereby when said magnetic field is weakened said armature is retracted, and a signal-controlling device operated by the movement of the armature, substantially as described.

2. In a track instrument, the combination, with a magnet producing a magnetic field adapted to influence a magnetically-operated signal-controlling device, said magnet having pole-pieces so arranged that when a train passes over the track a portion of the magnetic circuit is diverted from said field by being shunted through magnetic portions of the train, and the magnetic field is thereby weakened, of a lever of magnetic material, movably mounted and arranged to be influenced by the said field of said magnet, a retractile device opposing the action of said magnetic field on said lever, whereby when said magnetic field is weakened said lever is retracted, and a signal-controlling device operated by the movement of the lever, substantially as described.

3. In a track instrument, the combination, with a magnet having pole-pieces arranged to produce a magnetic field in the line of motion of a train passing over the track, whereby when a train passes over the track the magnetic field is caused to pass through magnetic portions of the train and a path for the magnetic field of less resistance than the normal path is thereby provided, of a second set of pole-pieces for said magnet producing a magnetic field, and a lever of magnetic material, movably mounted in said magnetic field, and having a retractile device opposing the action of the magnetic field thereon, and arranged to draw the lever away from its normal position when the strength of the field of said last-named pole-pieces is diminished, substantially as described.

4. In a track instrument, the combination, with a magnet having pole-pieces arranged to produce a magnetic field in the line of motion of a train passing over the track, whereby when a train passes over the track the magnetic field is caused to pass through magnetic portions of the train and a path for the magnetic field of less resistance than the normal path is thereby provided, of a second set of pole-pieces for said magnet and a lever of magnetic material, connected to one of said last-named pole-pieces and arranged to be attracted to the other, but to swing away therefrom when the strength of the field of said last-named pole-pieces is diminished, substantially as described.

5. In a track instrument, the combination, with a magnet having its poles connected with the track-rails, of magnetic conductors connected with said magnet-poles, a lever of magnetic material connected with one of said conductors and arranged to be attracted by the other conductor, and a retractile device for drawing said lever away from said second conductor, whereby, when the magnetic circuit through said conductors is short-circuited by wheels passing over the track, said lever is operated, substantially as described.

6. In a track instrument, the combination, with a magnet having its poles connected with the track-rails, of flexible magnetic conductors connected with said magnet-poles, a lever of magnetic material connected with one of said conductors and arranged to be attracted by the other conductor, and a retractile device for drawing said lever away from said second conductor, whereby, when the magnetic circuit through said conductors is short-circuited by wheels passing over the track, said lever is operated, substantially as described.

7. In a track instrument, the combination, with a magnet having its poles connected with the track-rails, of magnetic conductors connected with said magnet-poles, a lever of magnetic material connected with one of said conductors and arranged to be attracted by the other conductor, a retractile device for drawing said lever away from said second conductor, whereby, when the magnetic circuit through said conductors is short-circuited by wheels passing over the track, said lever is operated, and signal-controlling devices operated by said lever, substantially as described.

8. In a track instrument, the combination, with a track-magnet, having its cores connected to opposite track-rails, thereby constituting the rails poles of the magnet and producing a magnetic field extending across the track which will pass through the wheels and axles of a train passing over the track, of a signal-controlling device operated by the passage of said magnetic field through the wheels and axles, substantially as described.

In testimony whereof I affix my signature in presence of two witnesses.

THOMAS BULLITT DIXON.

Witnesses:
CAROLINE E. DAVIDSON,
HARRY M. MARBLE.